Patented Apr. 1, 1930

1,752,356

UNITED STATES PATENT OFFICE

WALTER C. SMITH, OF MOYLAN, PENNSYLVANIA, ASSIGNOR TO PRIMOS LEAD COMPANY, OF PHILADELPHIA, PENNSYLVANIA, A CORPORATION OF DELAWARE

PROCESS FOR RECLAIMING BATTERY-PLATE MATERIAL

No Drawing. Application filed January 14, 1927. Serial No. 161,234.

This invention relates to a process for converting waste lead compounds, or other lead compounds of relatively small value, into sponge lead or other products of increased value.

The salvaging or reclamation of lead compounds from residues, or sources of waste such as scrap storage battery plates, is ordinarily effected by relatively expensive and inefficient smelting operations which produce pig lead.

A general object of the present invention is to provide a method for treating lead compounds, such as are contained in scrap battery plates, for converting the compounds into a form of sponge lead, which in turn may be easily converted into litharge, red lead, or other useful and relatively valuable products.

I have found that, following the crushing of the material, the metallic lead and alloy content of scrap battery plate material can be readily separated by mechanical screening, from the lead compounds, the metals being then directly smelted to produce a commercial form of lead. The remaining lead compound content of the material is then subjected to a leaching or extracting operation in a caustic liquor, such as a solution of caustic soda. The leaching operation has the effect of dissolving the lead compounds and producing a solution containing the same. Various impurities, including antimony, do not go readily into solution but remain as an insoluble residue so that a method of separating most of the antimony from lead is included as a part of the process. The insoluble residue may be separately treated, after removal of the solution by decantation, or in any other suitable manner, by smelting, to produce metallic products such as antimonial lead in commercial form.

The solution of lead compounds is then treated with sponge lead to precipitate impurities. After separating the purified liquor from the precipitated impurities, sponge lead either in a dense and adherent or in a loose and non-adherent form is separated therefrom. The separation of sponge lead is preferably effected by electrolytic deposition and in a type of apparatus in which rapid relative motion is produced between the solution and the electrode members to prevent adherence of sponge lead particles to the surfaces on which they are deposited. The electrolytic deposition apparatus may be regulated to obtain a dense and adherent, or a loose and non-adherent type of sponge lead, as may be desired.

When the sponge lead has been deposited as a precipitate and removed the soluble hydrate or caustic liquor remaining is subjected to a regenerating operation in order to remove sodium sulphate which gradually builds up in the leaching liquors as a result of the interaction between the sodium hydroxide and the lead sulphate, of which the plate filling or coating material chiefly consists in an exhausted battery.

The removal of the sodium sulphate may be accomplished in any desired manner as by subjecting the solution to a refrigerating action to bring about the precipitation of the sodium sulphate which may then be removed by mechanical separation.

Another practical method of treatment consists in chemical precipitation by making use of a soluble hydrate of alkaline earth metals thereby converting the sodium sulphate into an insoluble sulphate which is precipitated as a readily removable solid residue. The removal of the insoluble sulphate results in the regeneration or recausticizing of the liquor for reuse in leaching further material.

The sponge lead precipitated from solution by electrolytic or other method of deposition is subjected to a washing treatment to remove soluble salts and is then in condition to be marketed as a commercial form of sponge lead, or converted into pig lead or into one of its oxide forms such as litharge or red lead, as may be found most desirable. Such sponge lead is very easy to oxidize and is therefore particularly well adapted for the manufacture of lead oxides.

While I have referred to the crushing and screening of the material as the first preliminary steps in the mechanical preparation of the material for the leaching treatment of the lead compounds, I also contemplate the preliminary subjection of the battery plate material to treatment in a suitable furnace in order to melt and remove metallic lead and alloys. The remaining non-metallic portion of the material is then crushed to suitable size and leached.

Materials which contains lead peroxide, which is insoluble in the leach liquor, may also be subjected to a special form of preliminary treatment which comprises heating the material preferably in the presence of a reducing agent to a temperature at which the lead peroxide is reduced to lead monoxide. If organic materials are contained in the scrap, they may serve as effective reducing agents.

What I claim is:

1. The process for reclaiming lead from lead bearing material which comprises crushing and screening the material to separate the metallic portions from the non-metallic portions, leaching the non-metallic portions with a caustic solution to dissolve the lead compounds therein, precipitating impurities from the solution by treatment with sponge lead, separating the purified solution, and electrically precipitating sponge lead from the solution.

2. The process for reclaiming lead from lead bearing material which comprises dissolving the lead compounds in a caustic solution, precipitating impurities from the solution by treating with sponge lead and electrically precipitating sponge lead from the solution.

WALTER C. SMITH.